United States Patent
Geary et al.

(10) Patent No.: US 8,235,437 B2
(45) Date of Patent: Aug. 7, 2012

(54) ELECTRIC GRIPPER DRIVE WITH A TORSIONAL COMPLIANCE DEVICE

(75) Inventors: James Geary, Pawcatuck, CT (US); Peter McCormick, Dallas, TX (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 12/755,796

(22) Filed: Apr. 7, 2010

(65) Prior Publication Data
US 2011/0248520 A1 Oct. 13, 2011

(51) Int. Cl.
B25J 15/00 (2006.01)
(52) U.S. Cl. .................................................. 294/119.1
(58) Field of Classification Search ............... 294/119.1, 294/207, 86.4, 103.1, 902, 907; 901/37, 901/39; 269/32, 34, 233, 234
See application file for complete search history.

(56) References Cited

U.S. PATENT DOCUMENTS

| | | | |
|---|---|---|---|
| 3,896,681 A | 7/1975 | Boyle | |
| 3,935,950 A | 2/1976 | Burch | |
| 3,954,188 A | 5/1976 | Boyle | |
| 4,744,266 A | 5/1988 | Shivarov et al. | |
| 4,763,055 A | 8/1988 | Daggett et al. | |
| 4,808,898 A * | 2/1989 | Pearson | 318/568.21 |
| 4,819,978 A * | 4/1989 | Scheinman et al. | 294/119.1 |
| 4,864,206 A | 9/1989 | Onaga et al. | |
| 5,054,836 A | 10/1991 | Schulz | |
| 5,080,415 A * | 1/1992 | Bjornson | 294/119.1 |
| 6,123,185 A | 9/2000 | Demarest et al. | |
| 6,123,375 A * | 9/2000 | Fussey et al. | 294/88 |
| 6,332,636 B1 | 12/2001 | Cohen et al. | |
| 6,343,242 B1 | 1/2002 | Nomura et al. | |
| 6,385,509 B2 | 5/2002 | Das et al. | |
| 6,394,521 B1 | 5/2002 | Bertini | |
| 6,601,468 B2 | 8/2003 | Grover et al. | |
| 6,748,298 B2 | 6/2004 | Heiligensetzer | |
| 6,785,572 B2 | 8/2004 | Yanof et al. | |
| 6,817,640 B2 | 11/2004 | Menon et al. | |
| 6,826,977 B2 | 12/2004 | Grover et al. | |
| 7,300,082 B2 | 11/2007 | Rogers et al. | |
| 7,422,411 B2 | 9/2008 | Downs et al. | |
| 7,438,724 B2 | 10/2008 | Sears et al. | |

* cited by examiner

*Primary Examiner* — Paul T Chin
(74) *Attorney, Agent, or Firm* — Harness, Dickey & Pierce, P.L.C.

(57) ABSTRACT

An electric gripper has a housing with a motor. A gearhead is coupled with the motor. A controller is electrically coupled with the motor to control the gripper via the motor. A compliance device is coupled with the motor. The compliance device absorbs impact energy created by the device. A drive mechanism is coupled with the compliance device and with a jaw movable on the housing. Fingers are coupled with the jaw that opens and closes to grip a part.

10 Claims, 4 Drawing Sheets

ELECTRIC GRIPPER DRIVE WITH A TORSIONAL COMPLIANCE DEVICE

FIELD

Figure 1:
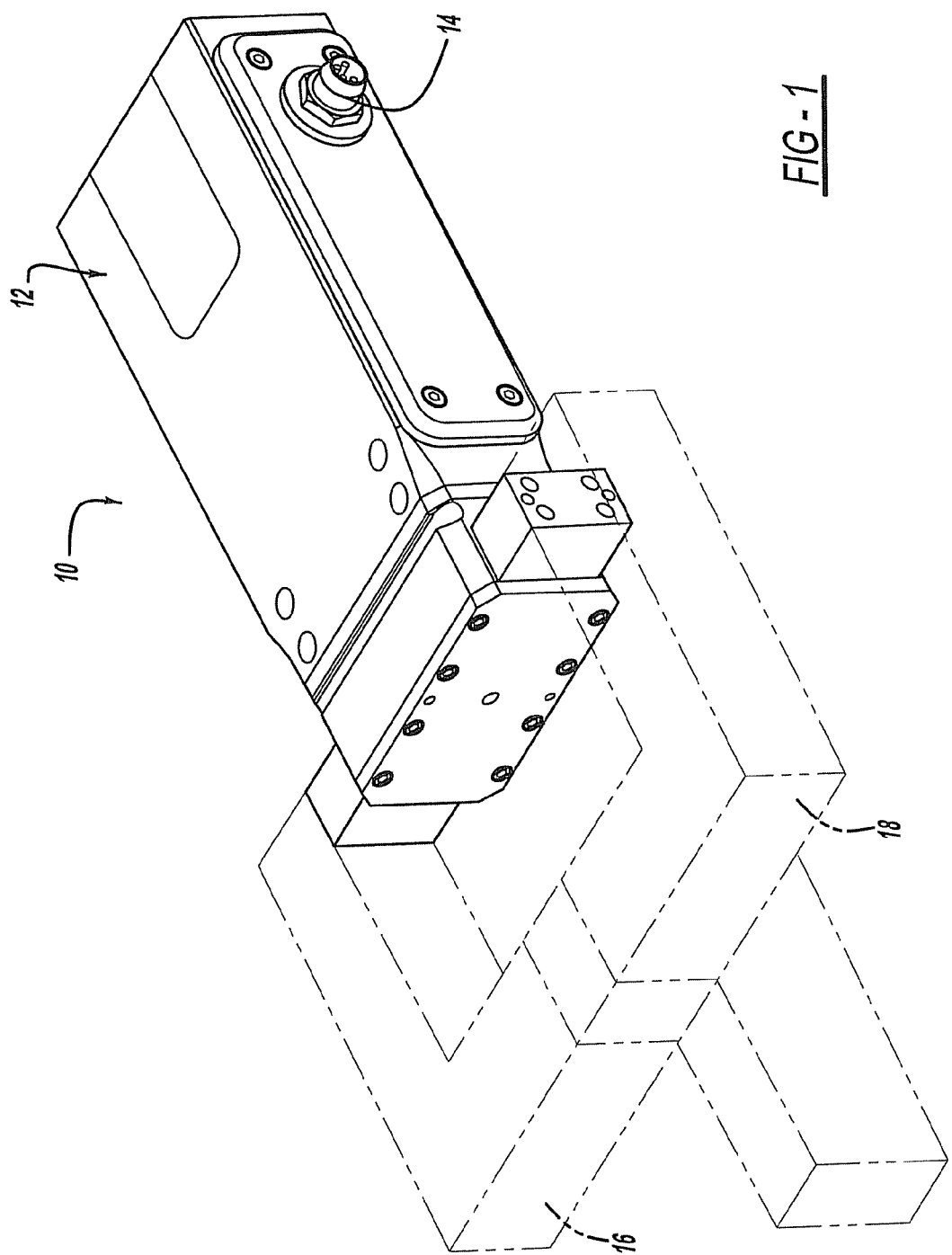

The present disclosure relates to an electric gripper that includes a drive with a torsional compliance device that has the ability to absorb impact energy.

BACKGROUND

Most electric grippers in use today are servo-driven providing them with the ability to decelerate the drive motor. The deceleration occurs in such a way that wear is limited on the drive components. This reduces the possibility of jamming the gripper members. These drives are constructed with expense motors and feedback devices, such as encoders and controllers that are complex and require significant programming. In order to reduce the cost of the electric gripper, it would be desirable to use a DC brushed motor.

The DC motor would be hard coupled to a gripper and run to a hard stop position, that is, full open/full closed or gripping the part. Here, the motor must abruptly stop when these hard stops are encountered. From an energy perspective, the system entering the hard stop position has both driving electrical energy of the motor, which provides torque to actuate the gripper, as well as kinetic energy of the drive train components moving at full speed.

The instantaneous deceleration of the hard stopping causes several mechanical problems. It causes impact loading on the gear reducer, jamming and wear of the gripper drive. Overloading the gear reducer will cause it to wear at an accelerated rate rendering it unusable over a very short period of time. Gear fracture has also been experienced in units. Some of the kinetic energy goes into jamming the device and creating wear on various drive components. Once the drive is jammed, it becomes impossible for the motor to develop enough electrical driven torque to reverse direction of the drive to unjam the mechanism. Additionally, the abrupt deceleration also has an adverse effect on the motor brushes causing electrical arcing and higher than normal wear of the brushes. This type of gripper must also be powered at all times in order to retain a part in the fingers during gripping. If current is not limited, the motor can overheat which, in turn, will decrease its life. In short, utilizing an inexpensive DC brush motor has significant drawbacks.

SUMMARY

It is an object of the present disclosure to provide a gripper with an electrical motor that overcomes the above shortcomings. The gripper needs to capture the kinetic energy of the hard stops in such a way to enable the entire system to decelerate in a reasonable manner. Crashing energy must be dissipated to ensure long life of the motor, gearhead and gripper components. Additionally, the fingers must not open in a power loss situation. Also, power supplied during gripping must be within a reasonable range so that it does not overheat the motor.

According to an aspect of the disclosure, a gripper comprises a housing with an electric motor positioned in the housing. A gearhead is coupled with the motor to provide a gear reduction ratio. A controller is electrically coupled with the motor to control the gripper, via the motor. A compliance device is coupled between the gearhead and the gripper drive. The compliance device, such as a torsional coupling, has the ability to absorb impact energy generated when the device reaches a hard stop. A drive mechanism is coupled with the compliance device. Jaws are coupled with the drive mechanism and are movable along the housing. Fingers are coupled with the jaws to grip a part on workpiece. Additionally, the controller is provided, in case of a power failure, with a circuit that provides back electromotive forces to ensure that the gripper fingers do not open and drop the part. The current is limited to the maximum required for gripping which, in turn, keeps the motor cooled. The gearhead reduction ratio may be in a range of values that enable different speed & torque outputs that translate to gripper actuation time and grip force. Reduction ratios are in a range of 15:1 through 400:1. These reduction ratios are useful in various gripping applications requiring very high speeds, high grip forces or a combination of speed and grip force. A useful reduction ratio is 53:1.

In a second aspect of the disclosure, a gripper comprises a housing with a channel defined by a pair of walls of the housing. A brush motor is coupled with and positioned in the housing. A gearhead is coupled with the motor. A controller is electrically coupled with the motor. The controller controls the gripper, via the motor. Additionally, the controller is positioned in the housing. A torsional coupling is coupled with the motor. The torsional coupling is positioned in the housing. The torsional coupling absorbs impact energy generated when the device reaches a hard stop. A drive mechanism is coupled with the torsional coupling for driving a pair of jaws. The jaws move in the channel of the housing. A pair of fingers has each finger coupled with one of the jaws for gripping a part.

Further areas of applicability will become apparent from the description provided herein. The description and specific examples in this summary are intended for purposes of illustration only and are not intended to limit the scope of the present disclosure.

DRAWINGS

The drawings described herein are for illustration purposes only and are not intended to limit the scope of the present disclosure in any way.

Figure 2:
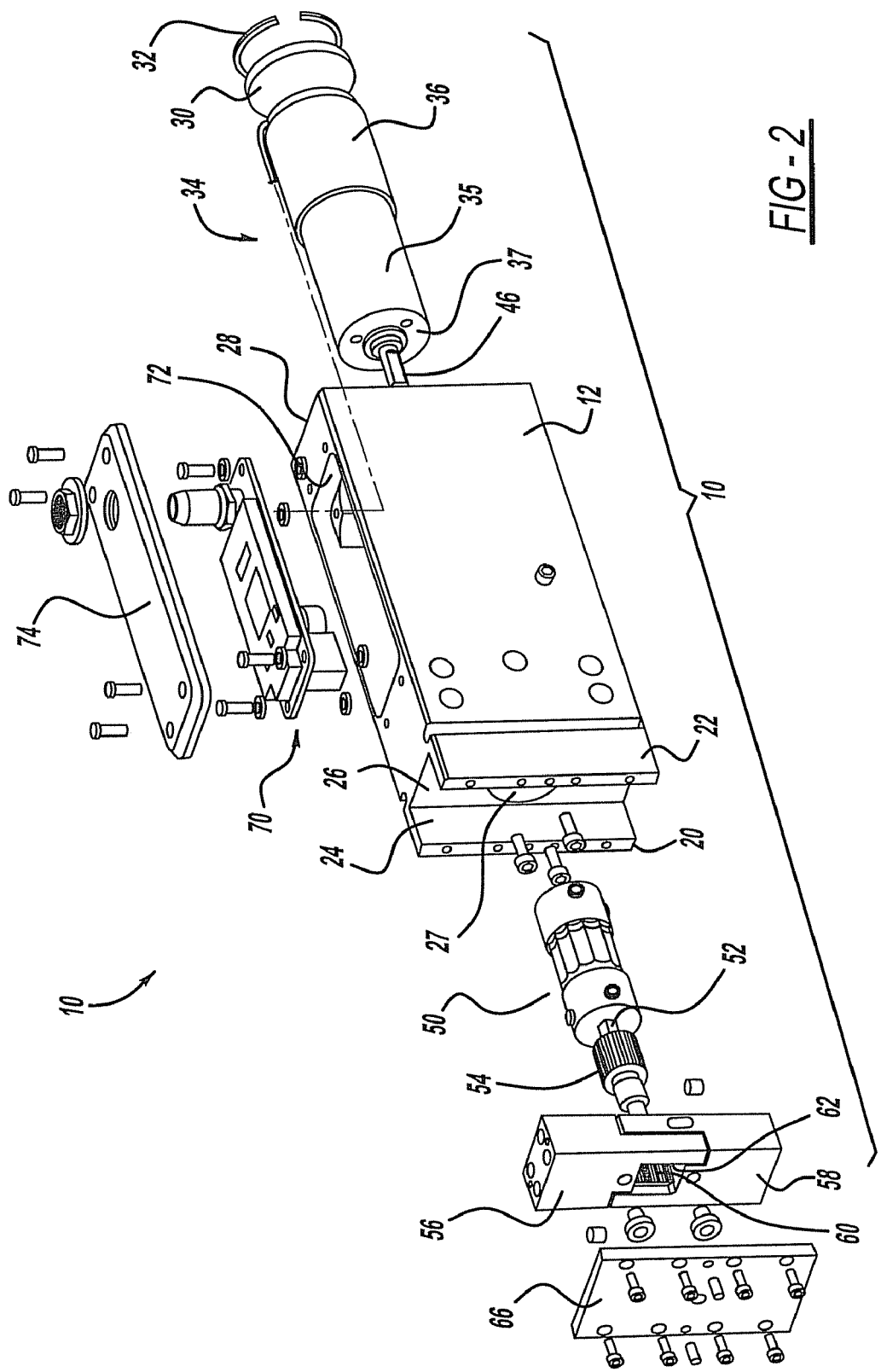
Figure 3:
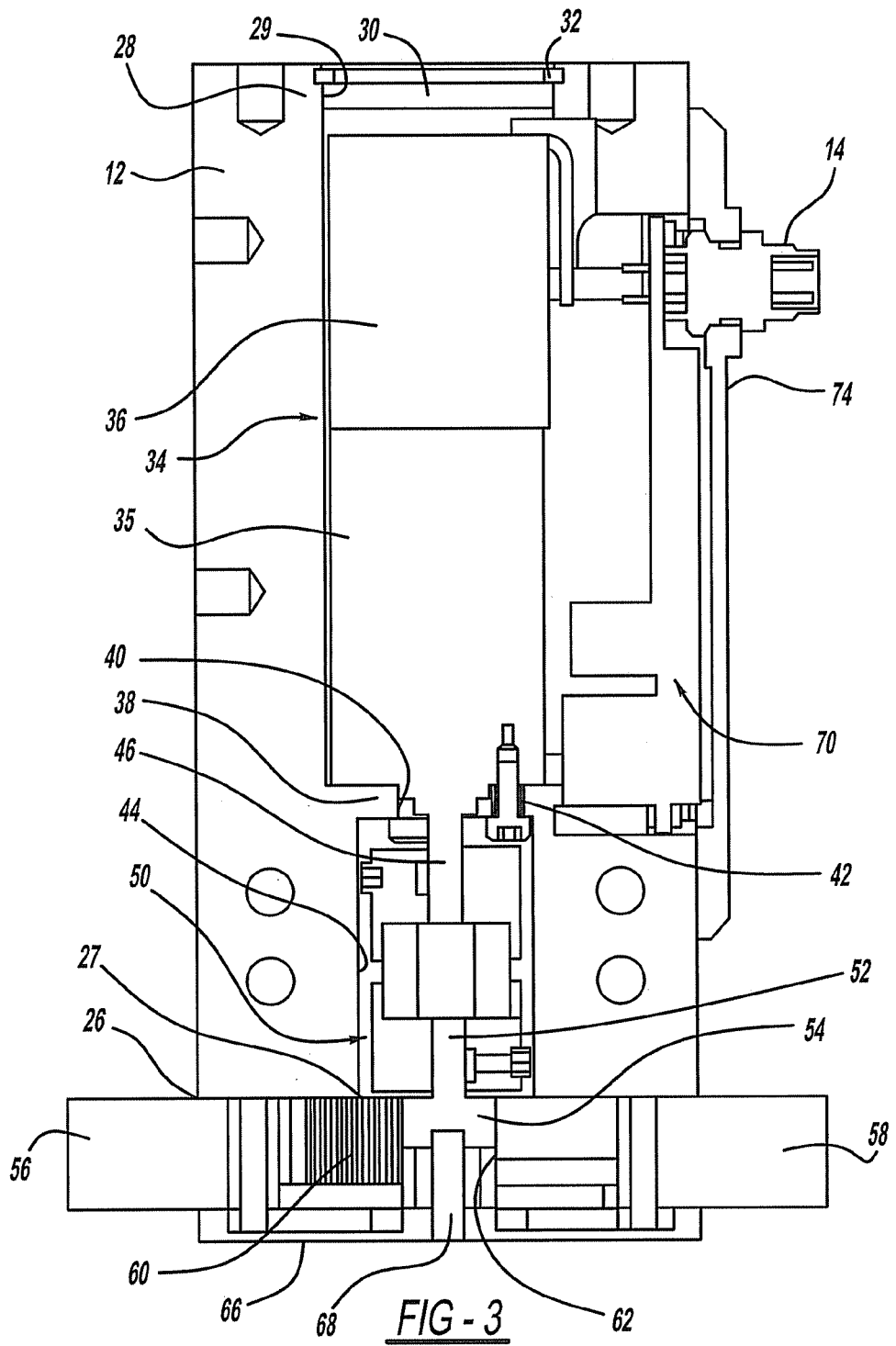
Figure 4:
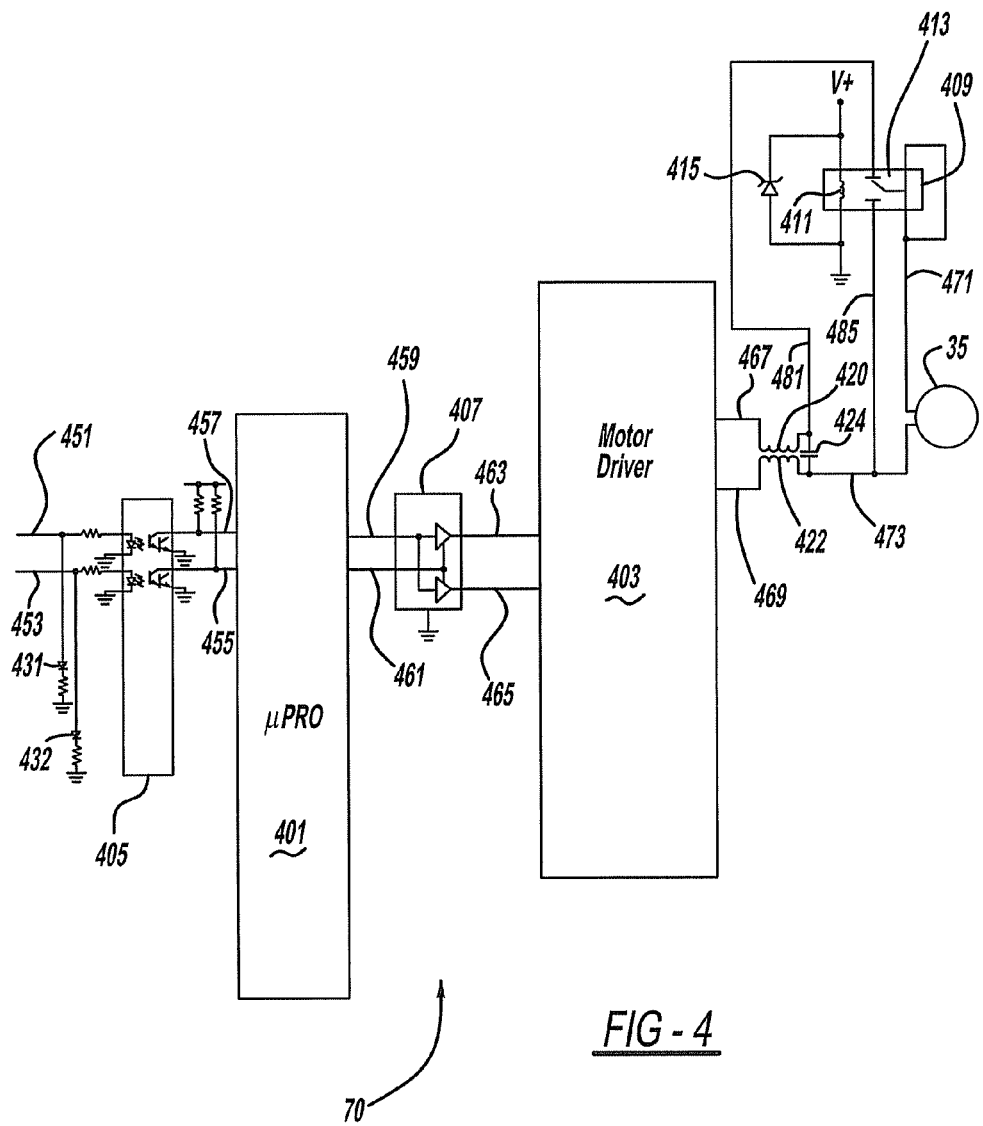

FIG. 1 is a perspective view of a gripper in accordance with the present disclosure.
FIG. 2 is an exploded view of the gripper of FIG. 1
FIG. 3 is a cross-sectional view of FIG. 1.
FIG. 4 is a schematic view of the controller.

DETAILED DESCRIPTION

Turning to the figures, FIG. 1 illustrates an electric gripper and is designated with the reference numeral 10. The gripper includes a housing 12 with an electrical connection plug 14 projecting from the housing. A power source (not shown) is coupled with the connection 14. A pair of gripper fingers 16, 18 extends from the housing.

FIG. 2 illustrates an exploded view of the gripper apparatus 10. The housing 12 has an overall rectangular box shape with one end includes a pair of walls 20, 22 that receive the jaws as will be described later. The walls define a channel 24 that includes a base wall 26. An aperture 27 is formed in the base wall 26 that enables access into the housing 12. The housing 12 includes an additional top wall 28 that include an aperture 29 to enable passage of the motor assembly into the housing 12. Additionally, a cover 30 is secured in the aperture 29 by a C-ring 32 to maintain the motor assembly within the housing 12.

The gripper 10 includes a motor assembly 34. The motor assembly 34 includes an electric motor, here illustrated as a DC brush motor 35. Ordinarily, the motor 35 includes carbon graphite brushes. The high speed and low torque style of the motor 35 requires mechanical reduction. Other motors, such as AC, brush, brushless, stepper, induction, vector motors or the like may also be utilized. Here the motor assembly 34 includes a gearhead 36.

The gearhead 36 is coupled with the motor 35. The gearhead 36 develops lower speeds and high torques that are required by the gripper 10. The gearhead 36 has a lower gear ratio that is used to meet the speed and torque specifications of the gripper 10. Accordingly, the reduction ratio is lower and is back drivable. The gearhead has a reduction ratio from 15:1 to 400:1. The 15:1 low reduction ratio provides very high gripper actuation speed and low force. The high reduction ratio of 400:1 provides a very high grip force with low speed. A reduction ratio value somewhere in the middle provides good speed with adequate gripping force.

The motor 35 and gearhead 36 are passed through the top wall 28 through the aperture 29. The motor base 37 rests on a wall 38 inside of the housing 12. The wall 38 includes an aperture 40 as well as bolt holes 42. The motor shaft 46 extends through the aperture 40 into a housing opening 44. The housing opening 44 houses a compliance device 50.

The compliance device 50 includes a portion to receive the motor shaft 46. Additionally, the compliance device 50 includes an output spindle 52 with a drive mechanism 54. The drive mechanism 54 may be a pinion gear, ball screw or the like for driving purposes. The compliance device 50 can be a torsional coupling. The compliance device 50 enables the energy of the impact to be spread over a long period of time. This causes a greatly reduced impact load by decreasing the deceleration rate of the motor 35. The torsional coupling also stores the impact energy. This enables the energy to be used when the motor is signaled to go into a reverse direction. Stored energy is converted into reverse torque to enhance the gripper drive into a reverse direction when commanded to do so by the controller.

Most couplings are designed with minimal torsional deflection and minimal backlash. This enables precision control of a motion device's positioning. However, low backlash and high torsional rigidity of common couplings impart extremely high impact forces to the disclosed design when reaching a hard stop. In the present design, a coupling with extremely low torsional stiffness must be used. If backlash is present, it does not adversely affect the performance. The present coupling has the ability to rotate through about 15° compliance to enable a slow deceleration. This coupled with various gear head reduction ratios enables the motor to decelerate through a partial rotation, or up to several revolutions of the motor's rotor. This long deceleration travel reduces damage to the motor's commutation brushes and gearbox components. In addition to low torsional stiffness, the coupling must be able to absorb this energy over tens of millions of cycles without deteriorating. Several elastomeric coupling materials, when used in low durometers, can provide compliance in these types of couplings, specifically EPDM, neoprene or Hytrel, from E.I. DuPont de Nemours, may be used.

The drive mechanism 54 is coupled with the compliant coupling 50 and drives racks 60 & 62 that are attached to the jaws 56 & 58. In this case, the racks are machined directly into the jaws to reduce the overall size of the jaws. The jaws slide on base wall 26 in the channel 24 of the housing 12. Thus, as the spindle 52 rotates, the jaws 56, 58 are moved toward and away from one another which, in turn, moves the gripper fingers 16, 18 toward and away from one another to grip a part. Additionally, a cover plate 66 is coupled with and precisely located onto the walls 20, 22 to retain the jaws 56, 58 within the channel 24 of the housing 12. The cover plate 66 has an axel pin 68 that centers the bearing that radially supports the drive mechanism 54.

A controller 70 is positioned through an aperture 72 in the housing 12. The controller 72 is secured within the housing. The controller 70 is electrically coupled with the motor 35. The controller 70 is powered by the power source via the connector 14. Additionally, a cover plate 74 is positioned on top of the controller 70 to retain the controller 70 within the housing 12. Thus, the gripper becomes a contained unit waiting to receive power from the power source.

With reference to FIG. 4, gripper motor controller 70 utilizes a programmable microprocessor 401 and a motor driver 403 to cause the rotor shaft 46 of DC motor 35 to rotate in one of two directions in accordance with control inputs received at controller 70.

In operation, a request signal for opening or closing the gripper with DC motor 35 is received at controller inputs 451 and 453. A logic 1 (in this embodiment, a positive voltage) at input 451 with a logic 0 (in this embodiment, ground potential) at input 453 indicates a request to drive motor 35 in a direction so as to open the gripper. Similarly, a logic 0 at input 451 with a logic 1 at input 453 indicates a request to close the gripper via motor 35. LED 431 will illuminate whenever an open command is received at input 451, while LED 432 will illuminate whenever a closed command is received at input 453. The command requests at inputs 451, 453 then pass through optical isolator interface 405 to inputs 457 and 455 of microprocessor 401. Optical isolator 405 essentially converts the voltage level of the logic signals appearing at inputs 451 and 453 to a level suitable for use with microprocessor 401.

Microprocessor 401 is a commercially available device, and, in this embodiment, is comprised of a Texas Instruments MSP 430. Microprocessor 401 basically reads the command inputs at leads 455 and 457 and applies a pulse width modulated (PWM) voltage signal output at lead 459 and a direction-indicating logic signal at lead 461. After microprocessor 401 generates the PWM signal at output 459 and a direction-indicating signal at output 461, those outputs are fed to de-multiplexing circuit 407, which directs the PWM signal to one of motor controller driver 403 input 463 or 465, depending upon the direction-indicating signal at microprocessor output 461.

The PWM signal enables the running of the motor 35 at a low power. The motor 35 is under full power while it is running. Low power is required to grip a part. Thus, at low power, in a stalled condition, the motor does not overheat. Ordinarily, power is reduced to about 30% of full power while the gripper is open or closed.

Motor driver 403 is essentially an electronic version of an H-bridge, a motor driver arrangement well known in the art. In this embodiment, motor driver element 403 is a commercially available device from Apex—model SA53. As is known, an H-bridge arrangement is generally used to reverse the polarity of the drive signal to the motor. Hence, motor driver 403 places the PWM voltage signal at either output 467 or 469, depending upon which driver input 463 or 465 receives the PWM signal. The PWM voltage signal at output 467 or 469 is then converted to a substantially constant voltage level by a smoothing or integrating filter comprised of inductors 420 and 422 and capacitor 424. Hence, motor 35 rotates its rotor shaft 46 in a direction in accordance with the polarity of the voltage signal across motor drive inputs 471 and 473.

Accordingly, power is supplied to the controller 70. The controller 70 communicates with the motor 35 which, in turn, rotates the torsional coupling 50 and, in turn, the drive mechanism 54 that moves the jaws 56, 58 as well as the fingers 16, 18 toward and away from one another for clamping and releasing a part. Thus, the motor 35 is run between full open or full closed to grip or release the part. Accordingly, as the gripper 10 hits the full open or full closed position, the motor 35 must be abruptly stopped when these hard stops are encountered. As this occurs, the torsional coupling 50 rotates absorbing the energy created at the hard stops. Additionally, the torsional coupling decelerates the motor and as the coupling is released, the energy drives the gearhead and motor in a reverse direction opening the fingers. The PWM signal is used to substantially reduce the current to the motor while the gripper is open or closed. The motor is able to maintain grip force and keep motor temperature low while the motor is stationary by reducing power while it is stalled. Thus, the controller is very simple and includes an open loop design.

When power is lost to the gripper 10 and it is clamping a part, the torsional coupling 50 releases its energy driving the gearhead 36 and motor 35 backwards. As the motor 35 and gearhead 36 begin to rotate backwards, their kinetic energy can allow the motor 35 and gearhead 36, in a low friction system, to travel past the point of gripping. This may enable the gripper fingers 16, 18 to open dropping the part.

In order to remedy this situation, the short circuiting element 409 (FIG. 4) is placed as shown with respect to motor drive lines 471 and 473. In the embodiment shown, short circuiting element 409 is essentially a relay circuit whose coil 411 is normally coupled between positive potential and ground. In this power-on condition, the relay's transfer contact 413 connects lead 481 to lead 471 thereby applying driver output 467 to motor drive input 471. Should power be lost, the relay coil 411 will discharge through protective Zener diode 415 and the transfer contact will go to the power-off condition, where lead 485 is coupled to lead 471 thereby placing a short circuit across the drive inputs 471, 473 to motor 35. Maintaining current flow through relay coil 411 in the normal powered-up state keeps the contacts of transfer contact 413 clean. This arrangement enables motor 35 to produce a back electromotive force (EMF) that effectively supplies a torsional force to counteract the unwinding or back driving of the torsional coupling 50. This reduces the rate of opening of the fingers 16, 18 while keeping the jaws 56, 58 from going past the point of gripping. Thus, the back EMF is multiplied by the gearhead 36 to provide a substantial resistance force against opening of the fingers.

The description of the disclosure is merely exemplary in nature and thus, variations that do not depart from the gist of the disclosure are intended to be within the scope of the disclosure. Such variations are not to be regarded as a departure from the spirit and scope of the disclosure.

What is claimed is:

1. A gripper comprising:
a housing;
a motor positioned in the housing;
a gearhead coupled with said motor;
a controller electrically coupled with the motor for controlling the gripper via the motor;
a compliance device coupled with said motor, the compliance device storing impact energy wherein the stored energy is converted into reverse torque to enhance gripper drive in a reverse direction;
a drive mechanism coupled with said compliance device;
at least one jaw coupled with said drive mechanism, said at least one jaw movable on said housing; and
fingers coupled with said at least one jaw for gripping a part.

2. The gripper according to claim 1, wherein said compliance device further comprises a torsional coupling.

3. The gripper according to claim 1, wherein said gearhead is a reduction ratio gearhead.

4. The gripper according to claim 1, wherein said controller, during power failure, includes a circuit providing back electromotive force to ensure the fingers do not open dropping the gripped part.

5. The gripper according to claim 3, wherein the gearhead has a reduction ratio from 15:1 to 400:1.

6. The gripper according to claim 1, wherein said controller, while the motor is stationary, includes a circuit for substantially reducing current and thus power to the motor to prevent overheating while maintaining gripper portion.

7. A gripper comprising:
a housing, a channel defined by a pair of walls of said housing;
a brush motor coupled with and positioned in said housing;
a gearhead coupled with said motor;
a controller electrically coupled with said motor, said controller controlling said gripper via the motor and said controller positioned in said housing;
a torsional coupling coupled with said motor, said torsional coupling positioned in said housing; said torsional coupling storing impact energy wherein the stored energy is converted into reverse torque to enhance gripper drive in a reverse direction;
a drive mechanism coupled with said torsional coupling for driving a pair of jaws, said jaws move in said channel of said housing;
a pair of fingers, each finger coupled with one of said jaws for gripping a part.

8. The gripper according to claim 7, wherein said controller, during power failure, includes a circuit providing back electromotive force to ensure the fingers do not open dropping the gripped item.

9. The gripper according to claim 7, wherein the gearhead reduction ratio is between 15:1 to 400:1.

10. The gripper according to claim 7, wherein said controller, while the motor is stationary, includes a circuit for substantially reducing current and thus power to the motor to prevent overheating while maintaining gripper portion.

* * * * *

UNITED STATES PATENT AND TRADEMARK OFFICE
CERTIFICATE OF CORRECTION

PATENT NO. : 8,235,437 B2  
APPLICATION NO. : 12/755796  
DATED : August 7, 2012  
INVENTOR(S) : James Geary et al.

Page 1 of 1

It is certified that error appears in the above-identified patent and that said Letters Patent is hereby corrected as shown below:

Title page
Item (56), References Cited, insert the following:

--FOREIGN PATENT DOCUMENTS

EP   0 670 202   09/1995  
EP   0 540 777   05/1993  
EP   0 531 811   03/1993--

Signed and Sealed this

Fifteenth Day of January, 2013

David J. Kappos
*Director of the United States Patent and Trademark Office*